United States Patent
Hadano et al.

(10) Patent No.: US 10,703,384 B2
(45) Date of Patent: Jul. 7, 2020

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota-shi, Aichi-ken (JP)

(72) Inventors: Hiroyasu Hadano, Toyota (JP); Yusuke Kaneko, Toyota (JP); Jun Goto, Toyota (JP); Hiroko Tsujimura, Gifu (JP); Miho Otsuka, Nagoya (JP); Hideo Hasegawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/516,585

(22) Filed: Jul. 19, 2019

(65) Prior Publication Data
US 2020/0031368 A1  Jan. 30, 2020

(30) Foreign Application Priority Data
Jul. 26, 2018 (JP) .................................. 2018-140171

(51) Int. Cl.
*B60W 50/14* (2020.01)
*B60W 50/08* (2020.01)

(52) U.S. Cl.
CPC .......... *B60W 50/14* (2013.01); *B60W 50/087* (2013.01); *B60W 2050/146* (2013.01)

(58) Field of Classification Search
CPC ............................ B60W 50/14; B60W 50/087
See application file for complete search history.

(56) References Cited

U.S. PATENT DOCUMENTS

2015/0070155 A1* 3/2015 Reich ..................... G09F 13/04
340/425.5

FOREIGN PATENT DOCUMENTS

JP   2009-014954 A   1/2009

* cited by examiner

*Primary Examiner* — Curtis B Odom
(74) *Attorney, Agent, or Firm* — Oliff PLC

(57) ABSTRACT

An information processing apparatus is provided with a controller comprising at least one processor. The controller is configured to execute: displaying presentation information to be presented to a user of a vehicle at an inside or an outside of a window formed in a vehicle; switching over between displaying and non-displaying of the presentation information displayed at the inside of the window according to an instruction received from the user; and displaying the presentation information at the outside of the window in cases where the vehicle is located in a specific place.

10 Claims, 4 Drawing Sheets

[Fig. 1]
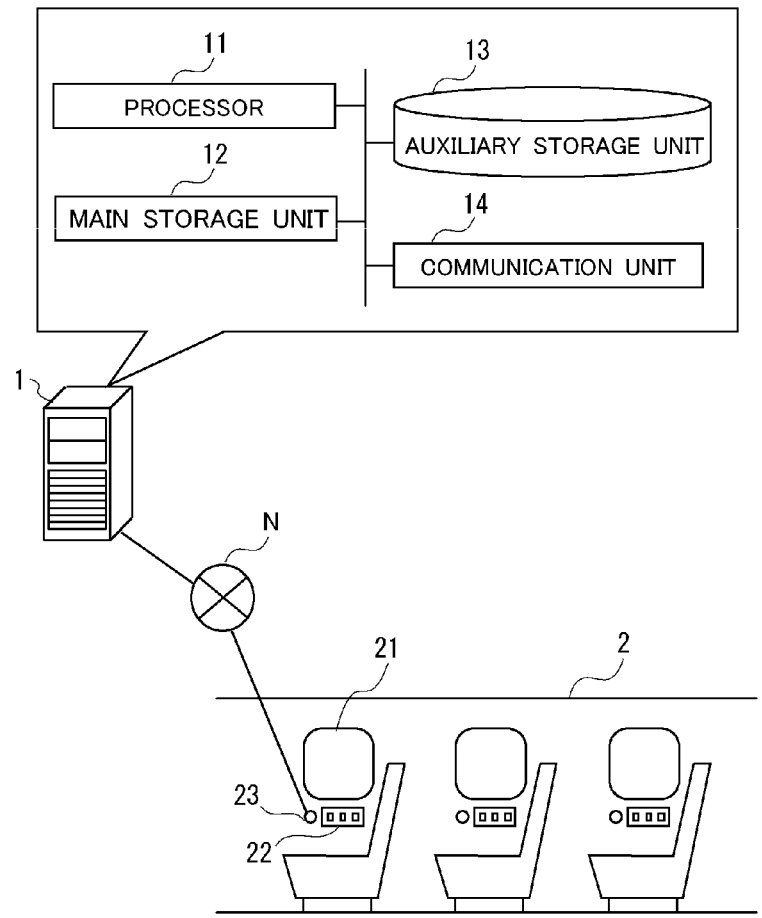
[Fig. 2]
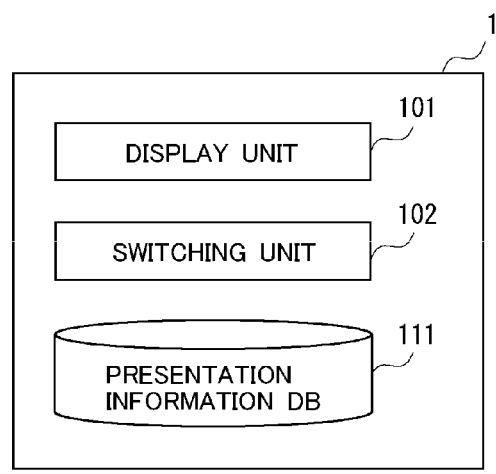

[Fig. 3]
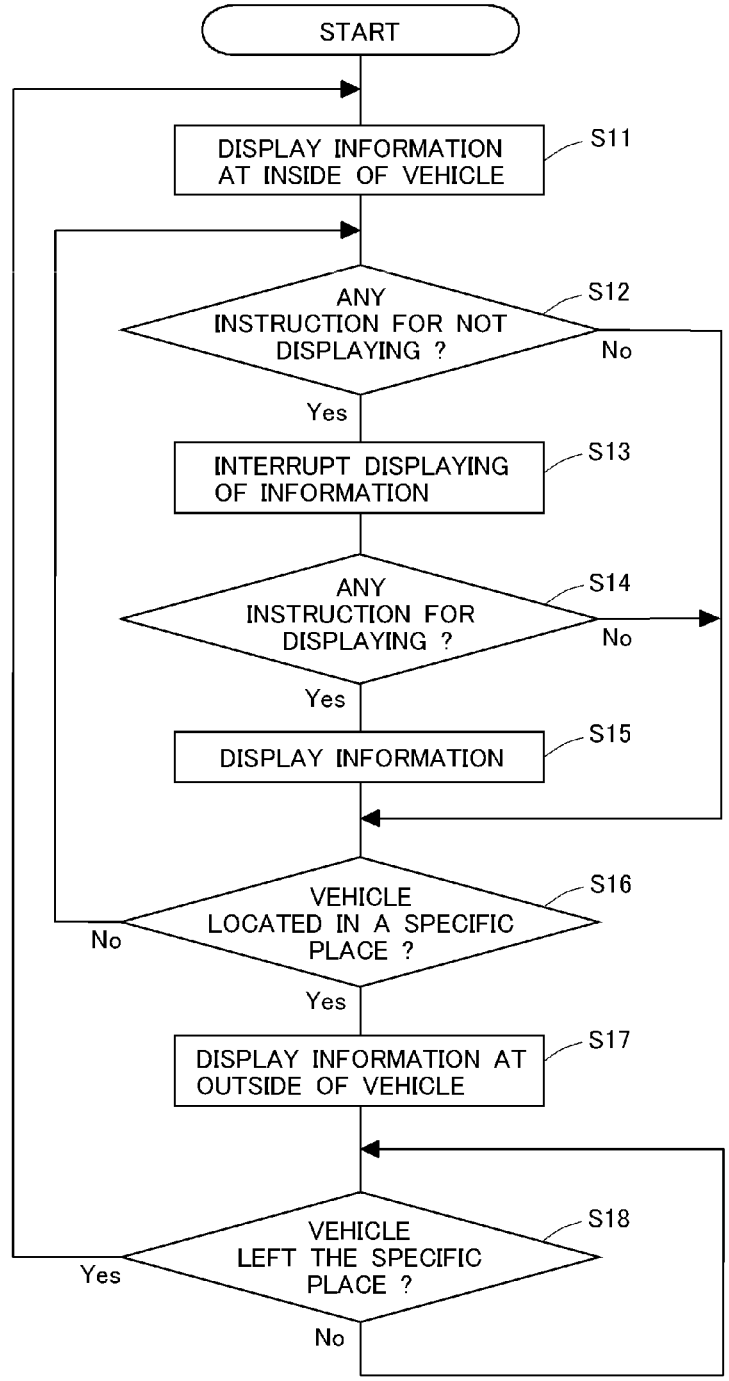

[Fig. 4]
| PRESENTATION OBJECT | DISPLAY OBJECT STATION | PRESENTATION INFORMATION |
|---|---|---|
| A1 RESTAURANT | A STATION | VIDEO A1 |
| A2 AQUARIUM | A STATION | VIDEO A2 |
| B1 ART MUSEUM | B STATION | VIDEO B1 |
| B2 EATING HOUSE | B STATION | VIDEO B2 |
| B3 CLINIC | B STATION | VIDEO B3 |
| C1 BOOK STORE | C STATION | VIDEO C1 |
| C2 DEPARTMENT STORE | C STATION | VIDEO C2 |
| C CITY PR | C STATION | VIDEO C3 |
| ... | ... | ... |
[Fig. 5]
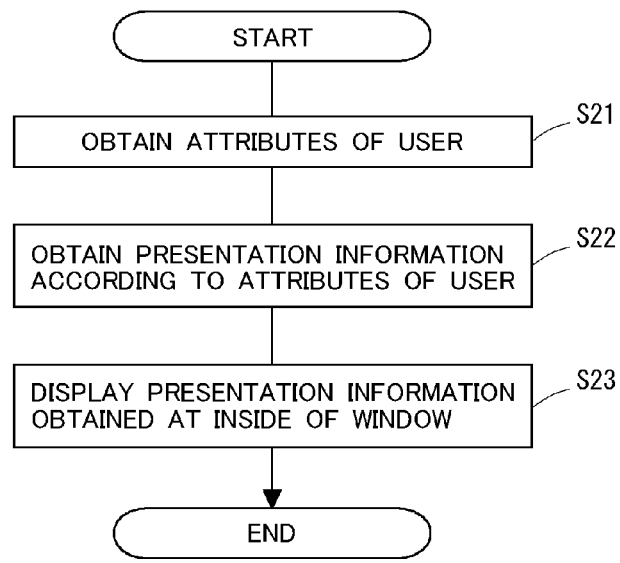

[Fig. 6]

| PRESENTATION OBJECT | DISPLAY OBJECT STATION | PRESENTATION INFORMATION | USER ATTRIBUTES | | |
|---|---|---|---|---|---|
| | | | SEX | AGE | FELLOW PASSENGER |
| A1 RESTAURANT | A STATION | VIDEO A1 | FEMALE | ADULT | PRESENCE |
| A2 AQUARIUM | A STATION | VIDEO A2 | — | CHILD | PRESENCE |
| B1 ART MUSEUM | B STATION | VIDEO B1 | FEMALE | ADULT | — |
| B2 EATING HOUSE | B STATION | VIDEO B2 | MALE | ADULT | ABSENCE |
| B3 CLINIC | B STATION | VIDEO B3 | — | ELDERLY PERSON | — |
| C1 BOOK STORE | C STATION | VIDEO C1 | MALE | — | ABSENCE |
| C2 DEPARTMENT STORE | C STATION | VIDEO C2 | FEMALE | ADULT | ABSENCE |
| C CITY PR | C STATION | VIDEO C3 | — | — | — |
| ... | ... | ... | ... | ... | ... |

INFORMATION PROCESSING APPARATUS, INFORMATION PROCESSING METHOD, AND NON-TRANSITORY STORAGE MEDIUM

CROSS-REFERENCE TO RELATED APPLICATIONS

This application claims the benefit of Japanese Patent Application No. 2018-140171, filed on Jul. 26, 2018, which is hereby incorporated by reference herein in its entirety.

BACKGROUND

Technical Field

The present disclosure relates to an information processing apparatus, an information processing method, and a non-transitory storage medium.

Description of the Related Art

In recent years, a transportation device (vehicle) such as a bus or an electric car is utilized for advertisement in various forms. For example, patent literature 1 discloses an advertising system which utilizes a window of a train as an advertisement area. In the patent literature 1, in cases where a transportation device is in a tunnel zone, an advertisement is displayed on a display device, and in cases where the transportation device is out of the tunnel zone, the display device is made transparent.

CITATION LIST

Patent Literature

Patent Literature 1: Japanese patent application laid-open publication No. 2009-014954

SUMMARY

The present disclosure has for its object to provide a technique of presenting information to a user of a vehicle in an effective manner.

A first aspect of the present disclosure resides in an information processing apparatus which includes a controller comprising at least one processor, the controller configured to execute:
displaying presentation information to be presented to a user of a vehicle at an inside or an outside of a window formed in the vehicle;
switching over between displaying and non-displaying of the presentation information displayed at the inside of the window according to an instruction received from the user; and
displaying the presentation information at the outside of the window in cases where the vehicle is located in a specific place.

A second aspect of the present disclosure resides in an information processing method causing a computer to execute:
a step of displaying presentation information to be presented to a user of a vehicle at an inside or an outside of a window formed in the vehicle;
a step of switching over between displaying and non-displaying of the presentation information displayed at the inside of the window according to an instruction received from the user; and
a step of displaying the presentation information at the outside of the window in cases where the vehicle is located in a specific place.

A third aspect of the present disclosure resides in a program or a non-transitory storage medium stored with the program, the program configured to cause a computer to execute:
a step of displaying presentation information to be presented to a user of a vehicle at an inside or an outside of a window formed in the vehicle;
a step of switching over between displaying and non-displaying of the presentation information displayed at the inside of the window according to an instruction received from the user; and
a step of displaying the presentation information at the outside of the window in cases where the vehicle is located in a specific place.

According to the present disclosure, it is possible to provide a technique of presenting information to a user of a vehicle in an effective manner.

BRIEF DESCRIPTION OF THE DRAWINGS

FIG. 1 is a view illustrating the schematic configuration of an information presentation system.

FIG. 2 is a view illustrating an example of the functional configuration of an information processing apparatus.

FIG. 3 is a flow chart illustrating an example of a flow of display control processing.

FIG. 4 is a view exemplifying a presentation information table.

FIG. 5 is a flow chart illustrating a flow of presentation information display processing according to a second modification.

FIG. 6 is a view illustrating a presentation information table according to the second modification.

DESCRIPTION OF THE EMBODIMENTS

A vehicle has windows formed for taking in light outside the vehicle as well as allowing a user to look at the outside of the vehicle, and hence, the windows have not been used as advertising media. There has been proposed a technique of utilizing the windows of a vehicle as advertisement areas, while light does not come into the vehicle from the outside thereof, as in a tunnel (see the aforementioned patent literature 1). However, the time for the vehicle to travel in the tunnel is limited, and the windows of the vehicle are not effectively utilized as media for presenting information including advertisements.

In view of the above, this embodiment provides an information processing apparatus (computer) configured to switch over between displaying and non-displaying of presentation information displayed on a window formed in a vehicle at the inside thereof according to an instruction received from the user, and to display the presentation information on the window at the outside thereof in cases where the vehicle is located in a specific place.

The information processing apparatus displays the presentation information to be presented to the user of the vehicle on the window formed in the vehicle at the inside or outside thereof. In this embodiment, the vehicle is not limited to a transportation device such as a bus or an electric car, but may include any transportation device in which a user is supposed to look at a window thereof during transportation of the user. The vehicle may also include a transportation device such as, for example, an airplane, a marine vessel, or the like.

The presentation information can include a variety of kinds of information such as traffic information, sightseeing information, weather information, congestion information of institutions, besides advertisements of restaurants, amusement facilities, etc. The window displaying the presentation information can be a transparent display, for example. In addition, there may be used a window of which transparency changes with application of a voltage, as in the case of an electronic curtain adopted in airplanes, etc. The window with changing transparency is possible to present the information to the user in its opaque state, by projecting images from a projector.

In addition, the information processing apparatus switches over between displaying and non-displaying of the presentation information displayed at the inside of the window according to the instruction received from the user. The instruction from the user can be accepted by a manual operation button arranged in the surrounding of a seat, for example. The information processing apparatus receives the instruction of the user by the manual operation button. In cases where an instruction for not displaying the presentation information is received from the manual operation button, the information processing apparatus interrupts the displaying of the presentation information. On the other hand, in cases where an instruction for displaying the presentation information is received from the manual operation button, the information processing apparatus displays the presentation information.

Moreover, in cases where the vehicle is located in the specific place, the information processing apparatus displays the presentation information at the outside of the window. The specific place is a place in which the user who is going to utilize the vehicle is out of the vehicle, and for example, a train station, a bus stop or the like is mentioned. The case where the vehicle is located in a specific place includes, but is not limited to, a case where the vehicle has stopped at the specific place. The case where the vehicle is located in a specific place need only be a case where the user can just see the window from the outside of the vehicle, and may include a case where the vehicle is slowing down for stop, or the vehicle is accelerating for starting or leaving, at the specific place. The information displayed at the outside of the vehicle may also be made to be seen from the inside of the vehicle, too. In addition, the information displayed at the outside of the vehicle may present a series of information to a plurality of windows or all the windows with which the vehicle is provided.

According to this embodiment, the information processing apparatus can display the presentation information to be presented to the user of the vehicle at the inside or outside of a window formed in the vehicle. The information processing apparatus switches over between displaying and non-displaying of the presentation information displayed at the inside of the window according to the instruction received from the user, so in cases where the user is going to look at the information, the information processing apparatus can present the information in an effective manner. In addition, in cases where the vehicle is located in the specific place, the information processing apparatus displays the presentation information on the window at the outside of the vehicle, so it can also present the information to the user outside the vehicle in an effective manner.

Embodiment

System Outline

FIG. 1 is a view illustrating the schematic configuration of an information presentation system according to a first embodiment of the present disclosure. In an example of FIG. 1, the information presentation system includes an information processing apparatus 1 which controls the display of information to a window 21 arranged for each seat of a vehicle 2. The information processing apparatus 1 is arranged, for example, in the vehicle 2, and is connected through a network N to a window 21, a console panel 22 and a sensor 23 which are arranged for each seat. Here, in this embodiment, it is assumed that the vehicle 2 is provided with a window corresponding to each seat, but is not limited to this. Even in cases where the vehicle 2 is provided with a window across a plurality of seats, as in the case of a bus or a local train, it is possible to control the interruption of information display at the inside of the vehicle, as well as switching between the display at the inside of the vehicle 2 and the display at the outside of the vehicle 2.

Each window 21 can be, for example, a transparent display or a window of which transparency is changed by application of a voltage. Each window 21 displays information received from the information processing apparatus 1. Each window 21 may be configured such that presentation information is projected by a projector which is connected to the information processing apparatus 1 through the network N.

Each console panel 22 receives from the user an instruction for switching the display of a corresponding window 21, and notifies the content of the instruction to the information processing apparatus 1. Each console panel 22 may be arranged in the surrounding of the corresponding window 21, and may be a remote controller which can be operated by the user at hand. In addition, each console panel 22 may be provided with an interface which receives a gesture input or an audio input besides a button input.

Each sensor 23 is used in order to determine whether a user has sit on a corresponding seat or in order to obtain an attribute of the user such as his or her sex, age or the like. Each sensor 23 is, for example, a human (or motion) detection sensor or a camera. In cases where the camera is used as a sensor 23, the information processing apparatus 1 can determine whether a user sits on a seat which is adjacent to a window 21 corresponding to this sensor 23, or whether a user is in the vehicle 2, by analyzing an image taken from the side of the window 21. In addition, by analyzing the feature of the user detected within the image thus taken, the information processing apparatus 1 can obtain the attribute of the user. The sensor 23 can detect the user existing in the surrounding thereof, and can transmit the information obtained by the detection to the information processing apparatus 1, at a predetermined time interval.

The network N is a public communication network on a worldwide scale such as, for example, the Internet, and WAN (Wide Area Network) or other communication networks may be adopted. In addition, the network N may also include a telephone communication network such as a cellular or mobile phone network or the like, a wireless communication network such as WiFi or the like.

Device Configuration

The information processing apparatus 1 is composed of a computer, a workstation or the like. The information processing apparatus 1 may be a computer arranged in the vehicle 2, in order to control the display to each window 21 provided on the vehicle 2. Such a computer has a processor 11 such as a CPU, a DSP or the like, a main storage unit 12 such as a read-only memory (ROM), a random-access memory (RAM) and the like, an auxiliary storage unit 13 such as an EPROM, a hard disk drive (HDD), removable media or the like, and a communication unit 14 for communicating with those devices which control the display to each window 21, such as the console panels 22, the sensors 23 and the projectors, or other devices.

Here, note that an operating system (OS), various kinds of programs, various kinds of tables, etc., are stored in the auxiliary storage unit 13, wherein individual functional units configured to achieve predetermined objects to be described later can be achieved by loading the programs stored there to a working area of the main storage unit 12, executing them, and controlling individual component units or parts through the execution of the programs. However, a part or all of the functional units may be achieved by a hardware circuit(s) such as an ASIC, an FPGA, etc. Here, note that the information processing apparatus 1 is not limited to the case where it is achieved by a single physical configuration, but may be configured by a plurality of computers which mutually cooperate with one another.

Functional Configuration

FIG. 2 is a view illustrating an example of the functional configuration of the information processing apparatus. The information processing apparatus 1 achieves the functions illustrated in FIG. 2, by loading a program(s) stored in the auxiliary storage unit 13 to the main storage unit 12 and executing them by means of the processor 11. That is, the information processing apparatus 1 includes a display unit 101, a switching unit 102, and a presentation information database (DB) 111. The presentation information database 111 is built by a database management system program which is executed by the processor 11 so as to manage the data stored in the auxiliary storage unit 13. The presentation information database 111 is a relational database, for example. The details of these functional units will be explained below in detail with reference to the following flow chart. In addition, the processor 11 configured to execute the program thereby to achieve these functions corresponds to a "controller" in the present disclosure.

Display Control Processing

FIG. 3 is a flow chart illustrating an example of a flow of display control processing. The display control processing illustrated in FIG. 3 is started, for example, by using, as an opportunity or a trigger, an event that the user gets in and starts the vehicle 2.

In step S11, the display unit 101 obtains presentation information presented to the user riding in the vehicle, and displays it on a window 21 at the inside of the vehicle. The display unit 101 can obtain the presentation information from the presentation information database 111. The display unit 101 may obtain the presentation information at a predetermined time interval. In addition, the display unit 101 may obtain the presentation information each time the vehicle 2 travels a predetermined distance.

Here, the presentation information stored in the presentation information database 111 will be explained according to FIG. 4. FIG. 4 is a view illustrating, as an example, a presentation information table. The presentation information table is a table for managing the presentation information to be displayed on the windows 21 of the vehicle 2 for each presentation object. The presentation information table has fields of objects to be presented (presentation objects), stations to be displayed (display object stations), and information to be presented (presentation information).

The presentation object fields store restaurants, amusement facilities, accommodations, medical institutions, local public entities, etc., which are the presentation objects of information. The display object station fields store nearest stations for presentation objects. For example, until the vehicle arrives at a display object station, the display unit 101 may obtain presentation information related to a display object(s) for the display object station, and display it on a window(s) 21. In cases where a plurality of pieces of presentation information are obtained, the display unit 101 can switch and display each piece of presentation information at every predetermined period of time, for example.

The presentation information fields store presentation information related to the presentation objects. The presentation information can include, for example, advertising information on restaurants, amusement facilities and accommodations, information on medical institutions, introduction of public institutions, weather information in the areas of display object stations, etc. In the example of FIG. 4, the presentation information fields store, but are not limited to, video data for each presentation object. Fields for storing still images as presentation information may be added. In this case, whether video(s) is/are displayed or a still image(s) is/are displayed may be switched over, according to a period of time during which the presentation information is displayed. In addition, fields for storing presentation information to be displayed at the inside of the vehicle and presentation information to be displayed at the outside of the vehicle, separately from each other, may be added.

Here, note that the display unit 101 may obtain presentation information from an external server which provides the presentation information through a network such as the Internet. In this case, the display unit 101 may request presentation information to the external server at predetermined timing, or may receive presentation information distributed in a periodic manner from the external server.

In step S12, the switching unit 102 determines whether an instruction for hiding or not displaying the presentation information displayed at the inside of the vehicle has been made from the user. The user can instruct to hide or not display the presentation information by operating the console panel 22. In cases where it is determined that there has been an instruction for hiding or not displaying the presentation information ("Yes" in step S12), the control processing or routine goes to step S13. On the other hand, in cases where it is determined that there has been no instruction for hiding the presentation information ("No" in step S12), the routine goes to step S16. In step S13, the switching unit 102 interrupts the display of the presentation information which is being displayed on the window 21 at the inside of the vehicle.

In step S14, the switching unit 102 determines whether an instruction for displaying again the presentation information with the display thereof interrupted in step S13 has been made from the user. The user can instruct to display the presentation information by operating the console panel 22. In cases where it is determined that there has been an instruction for displaying the presentation information ("Yes" in step S14), the routine goes to step S15. On the other hand, in cases where it is determined that there has been no instruction for displaying the presentation information ("No" in step S14,), the routine goes to step S16. In step S15, the switching unit 102 displays the presentation information with the display thereof interrupted, on the window 21 at the inside of the vehicle.

In step S16, the switching unit 102 determines whether the vehicle 2 is located in a specific place. The specific place is assumed to be a place where the user is in a position capable of seeing a window(s) 21 of the vehicle 2 from the outside of the vehicle. For example, as the specific place, there can be mentioned a train station, a bus stop, etc. In addition, the specific place may be a place where a bus as the vehicle is stopped at a red traffic light. In this case, the switching unit 102 can determine that the vehicle 2 is located in a specific place, by detecting that the vehicle 2 is stopped or that the speed of the vehicle 2 becomes equal to or less than a predetermined threshold value.

In addition, the specific place may have been stored in advance in the database built in the auxiliary storage unit 13. For example, the specific place can be registered as location information by GPS (Global Positioning System). The switching unit 102 can obtain the current position of the vehicle 2 at a predetermined time interval, and determine that the vehicle 2 is located in the specific place, in cases where a distance between the current position of the vehicle 2 and the specific place becomes equal to or less than a predetermined range. Here, note that the switching unit 102 can obtain the current position of the vehicle 2 from a GPS device arranged in the vehicle 2.

In cases where it is determined that the vehicle 2 is located in the specific place ("Yes" in step S16), the routine goes to step S17. On the other hand, in cases where it is determined that the vehicle 2 is not located in the specific place ("No" in step S16), the routine returns to step S12. Here, note that in cases where the presentation information is not displayed on the window(s) 21, the routine may return to step S14.

In step S17, the display unit 101 displays presentation information to be presented to the user outside the vehicle, on the window(s) 21 at the outside of the vehicle. The display unit 101 may display the presentation information, which has been displayed at the inside of the vehicle, on the window(s) 21 at the outside of the vehicle as it is. In addition, the display unit 101 may obtain and display, from the presentation information database 111, the presentation information to be displayed on the window(s) 21 at the outside of the vehicle.

In step S18, the switching unit 102 determines whether the vehicle 2 has left the specific place. In this case, for example, the switching unit 102 can determine that the vehicle 2 has left the specific place, by detecting that the vehicle 2 being stopped begins to move or that the speed of the vehicle 2 becomes equal to or more than the predetermined threshold value.

Moreover, in cases where the specific place has been stored in the auxiliary storage unit 13 as location information by GPS, the switching unit 102 can obtain the current position of the vehicle 2 at the predetermined time interval, and determine that the vehicle 2 has left the specific place, in cases where the distance between the current position of the vehicle 2 and the specific place becomes equal to or more than the predetermined range.

In cases where it is determined that the vehicle 2 has left the specific place ("Yes" in step S18), the routine returns to step S11. On the other hand, in cases where it is determined that the vehicle 2 has not left the specific place ("No" in step S18), the processing of step S18 is repeated at a predetermined time interval.

Here, note that in the example of FIG. 3, the explanation has been made by taking an example in which the same presentation information is displayed on each window 21, but the display unit 101 may be configured to display a series of information over a plurality of windows or all the windows with which the vehicle is provided, at the inside or outside of the vehicle. Moreover, the display unit 101 may display the presentation information on the entire interior of the vehicle by means of projection mapping.

Effects

According to this embodiment, the information processing apparatus 1 can display various kinds of presentation information on the windows 21 formed in the vehicle 2 at the inside or outside of the windows 21. In addition, the information processing apparatus 1 can switch over between displaying and non-displaying (hiding) of the presentation information displayed at the inside of the window 21 by an instruction from the user. For this reason, the information processing apparatus 1 can present information to the user who wants to gather information in an effective manner. Moreover, in cases where the vehicle 2 is located in the specific place, the information processing apparatus 1 can display the presentation information on the windows 21 at the outside of the vehicle. Accordingly, the information processing apparatus 1 can also present the information to the user outside the vehicle in an effective manner.

Modification 1

In the above-mentioned first embodiment, the information processing apparatus 1 displays presentation information on the windows 21 at the inside of the vehicle, and switches over between displaying and non-displaying of the presentation information, for example, according to an instruction from the user received with the console panel 22. In a first modification of the present disclosure, further, the information processing apparatus 1 switches over between the displaying and non-displaying of the presentation information, according to whether a user is sitting on a seat(s) adjacent to a window 21.

In the first modification, the switching unit 102 receives user information detected by a sensor 23, and determines whether a user is sitting on a seat which is adjacent to a window 21. For example, the switching unit 102 can receive a picked-up image of the seat, and can determine whether a user is sitting on the seat, according to whether the user is detected in the picked-up image. In addition, by receiving information on whether a sensor has detected a line of sight of a user, the switching unit 102 can also determine whether the user is sitting on the seat. Here, note that the seat(s) adjacent to the window 21 is not limited to one seat, but may also include a plurality of seats which can be detected by the sensor 23.

The switching unit 102 interrupts the display on the window 21 at the inside of the vehicle, in cases where it is determined that a user is not sitting on the seat(s) adjacent to the window 21. On the other hand, in cases where it is determined that a user is sitting on the seat(s) adjacent to the window 21, the switching unit 102 switches the display of the presentation information so that the presentation information is displayed on the window 21 at the inside of the vehicle. However, in cases where the user gives an instruction not to display on the window 21, the switching unit 102 may also make the presentation information remain not displayed.

In the first modification, the displaying and non-displaying of presentation information are switched over according to whether a user is sitting on the seat(s) adjacent to the window 21, so the consumption of useless electric power can be suppressed.

Modification 2

In the above-mentioned first embodiment and the above-mentioned first modification, the information processing apparatus 1 displays the presentation information of the same content on each of the windows 21. On the other hand, in a second modification of the present disclosure, the content of the presentation information displayed on each window 21 is changed according to the attribute of a user sitting on a seat adjacent to each window 21. The display control processing according to the second modification is different from the display control processing of the first embodiment illustrated in FIG. 3, in the processing of step S11 to display presentation information on each window 21 at the inside of the vehicle. The presentation information display processing for displaying the presentation information according to the attributes of a user on a window 21 at the inside of the vehicle will be explained based on FIG. 5 and FIG. 6.

FIG. 5 is a flow chart illustrating a flow or routine of the presentation information display processing according to the second modification. The presentation information display processing illustrated in FIG. 5 is started, for example, by using as an opportunity or a trigger an event in which it is detected by a sensor 23 that a user is sitting on a seat adjacent to a window 21.

In step S21, the display unit 101 obtains attributes of the user based on the information received from the sensor 23. The display unit 101 obtains analytical data such as the seated height, the skeleton of the face, etc., of the user from the picked-up image of the user picked up by the sensor 23, for example. The display unit 101 can estimate the attributes of the user by making a comparison between such analytical data and user attributes by reference to a database in which the user attributes (e.g., age and sex) and the analytical data have been stored by linking or associating them with each other.

In step S22, the display unit 101 obtains presentation information according to the attributes of the user obtained in step S21. Here, the presentation information according to the attributes of the user will be explained according to FIG. 6.

FIG. 6 is a view illustrating a presentation information table related to the second modification. In the example illustrated in FIG. 6, the presentation information table has fields that store user attributes about sex, age, and fellow passenger, in addition to the presentation information table illustrated in FIG. 4, Sex fields store the sex of users who are targets for presentation (i.e., presentation objects). In the example of FIG. 6, in cases where it is determined in step S21 that the user sitting on the seat is female, the display unit 101 can display presentation information in those records in which the sex fields are "female" or "–" (no condition specification of sex).

Age fields store the ages (i.e., the ranges of ages) of users who are presentation objects. In the example of FIG. 6, the attribute stored in each age field is defined as child (e.g., aged less than 20 years), adult (e.g., aged more than 19 years and less than 65 years), or elderly person (i.e., aged 65 years and over), in place of a specific range of ages. For example, in cases where it is determined in step S21 that the user sitting on the seat is an elderly person, the display unit 101 can display the presentation information in a record in which the age field is "elderly people", i.e., the presentation information on "B3 hospital".

Fellow passenger fields each store whether a presentation object user has a fellow passenger. In the example of FIG. 6, in cases where it is determined in step S21 that the user sitting on the seat is a child and has a fellow passenger, the display unit 101 can display the presentation information in a record in which the age field is "child" and the fellow passenger field is "present", i.e., the presentation information on "A2 aquarium". Here, note that the "present" or "absent" of a fellow passenger can be determined according to whether a plurality of users have been detected in the picked-up image picked up by the sensor 23 (camera).

The presentation information in the record in which the age is "child" and the fellow passenger is "present", such as the presentation object of "A2 aquarium", is assumed to be presented to a family. Thus, the user attributes may include attributes of a group of a plurality of persons, such as a family, husband and wife (couple), and friends. In this case, the user attributes are not limited to the example of FIG. 6, but may have fields which store information for determining the attributes of a group, such as the number of fellow passengers, the sex and age of each fellow passenger.

In step S22, the display unit 101 obtains a piece of presentation information according to the attributes of the user from the presentation information table illustrated in FIG. 6. The display unit 101 need only obtain the presentation information in the records in which at least one attribute among the user attributes obtained in step S21 agrees with one of the user attributes illustrated in FIG. 6. In addition, in order to narrow down the number of pieces of presentation information to be presented to the user, the display unit 101 may obtain, from the presentation information table, pieces of presentation information in the records in which the user attributes obtained in step S21 agree with the user attributes illustrated in FIG. 6, respectively.

In step S23, the display unit 101 displays the presentation information obtained in step S22 on the window 21 at the inside of the vehicle. The display unit 101 may preferentially display the presentation information in a record in which a larger number of user attributes agree with the user attributes obtained in step S21. In addition, the display unit 101 may change the display time of the presentation information according to the degree of agreement of the user attributes obtained in step S21 with the user attributes in each record of the presentation information table. That is, the display unit 101 may display the presentation information in a record in which a larger number of user attributes agree with the user attributes obtained in step S21, on the window 21 for a longer period of time.

In the second modification, the information processing apparatus 1 changes the content of presentation information according to the user attributes. In addition, the information processing apparatus 1 can also change the content of presentation information according to the attributes of the user and the fellow passenger(s). Accordingly, the information processing apparatus 1 can present the information to the user and the fellow passenger(s) in an effective manner.

Other Embodiments

The above-mentioned embodiments and modifications are only some examples, and the present disclosure can be implemented while being changed or modified suitably without departing from the spirit and scope of the present disclosure.

In addition, the configurations and processings explained in this disclosure can be implemented in various combinations thereof, as long as technical inconsistency does not occur.

Moreover, the processing(s) explained as carried out by a single device may be carried out by a plurality of devices. Alternatively, the processings(s) explained as carried out by different devices may be carried out by a single device. In a computer system, whether each function of the present disclosure is achieved by what kind of hardware configuration (server configuration) can be changed in a flexible manner.

The present disclosure can also be achieved by supplying a computer program to a computer which implements the functions explained in the above-mentioned embodiments and modifications, and by reading out and executing the program by means of one or more processors of the computer. Such a computer program may be supplied to the computer by a non-transitory computer readable storage medium which can be connected with a system bus of the computer, or may be supplied to the computer through a network. The non-transitory computer readable storage medium includes, for example, an arbitrary type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, an arbitrary type of medium suitable for storing electronic commands.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. An information processing apparatus including a controller comprising at least one processor, the controller configured to execute:
   displaying presentation information to be presented to a user of a vehicle at an inside or an outside of a window formed in the vehicle;
   switching over between displaying and non-displaying of the presentation information displayed at the inside of the window according to an instruction received from the user; and
   displaying the presentation information at the outside of the window in cases where the vehicle is located in a specific place.

2. The information processing apparatus according to claim 1, wherein
   the controller displays the presentation information at the inside of the window in cases where the vehicle is out of the specific place.

3. The information processing apparatus according to claim 1, wherein
   the controller switches over between the displaying and non-displaying of the presentation information, according to whether the user is sitting on a seat adjacent to the window.

4. The information processing apparatus according to claim 2, wherein
   the controller switches over between the displaying and non-displaying of the presentation information, according to whether the user is sitting on a seat adjacent to the window.

5. The information processing apparatus according to claim 3, wherein
   the controller changes a content of the presentation information according to an attribute of the user, in cases where the user is sitting on the seat adjacent to the window.

6. The information processing apparatus according to claim 4, wherein
   the controller changes a content of the presentation information according to an attribute of the user, in cases where the user is sitting on the seat adjacent to the window.

7. The information processing apparatus according to claim 1, wherein
   the window is a transparent display.

8. The information processing apparatus according to claim 1, wherein
   transparency of the window changes with application of a voltage, and the window displays the presentation information projected from a projector in an opaque state.

9. An information processing method causing a computer to execute:
   a step of displaying presentation information to be presented to a user of a vehicle at an inside or an outside of a window formed in the vehicle;
   a step of switching over between displaying and non-displaying of the presentation information displayed at the inside of the window according to an instruction received from the user; and
   a step of displaying the presentation information at the outside of the window in cases where the vehicle is located in a specific place.

10. A non-transitory storage medium stored with an information processing program configured to cause a computer to execute:
    a step of displaying presentation information to be presented to a user of a vehicle at an inside or an outside of a window formed in the vehicle;
    a step of switching over between displaying and non-displaying of the presentation information displayed at the inside of the window according to an instruction received from the user; and
    a step of displaying the presentation information at the outside of the window in cases where the vehicle is located in a specific place.

* * * * *